United States Patent [19]

Kumpar

[11] 4,403,522

[45] Sep. 13, 1983

[54] METHOD FOR MAKING A DEVICE FOR CONVERTING A ROTARY MOTION INTO A LINEAR MOTION

[75] Inventor: Zvonimir Z. Kumpar, Zeist, Netherlands

[73] Assignee: SKF Industrial Trading & Development Company B.V., Netherlands

[21] Appl. No.: 235,542

[22] Filed: Feb. 13, 1981

[30] Foreign Application Priority Data

Feb. 13, 1980 [NL] Netherlands .......................... 8000907

[51] Int. Cl.³ ............................................ F16H 21/16
[52] U.S. Cl. ............................................ 74/89; 74/25
[58] Field of Search ..................................... 74/25, 89

[56] References Cited

U.S. PATENT DOCUMENTS

| | | | |
|---|---|---|---|
| 4,141,255 | 2/1979 | Nilsson | 74/25 |
| 4,222,619 | 9/1980 | Nilsson | 74/25 |
| 4,253,342 | 3/1981 | Uhing | 74/89 |
| 4,311,058 | 1/1982 | Lundgren | 74/25 |

Primary Examiner—Lawrence J. Staab
Attorney, Agent, or Firm—Eugene E. Renz, Jr.

[57] ABSTRACT

A device for converting rotary motion into linear motion includes a smooth shaft and a plurality of circular rolling bearings mounted in a cylindrical housing. The rolling bearings each have an inner diameter greater than the outer diameter of the shaft. Each bearing is mounted in a two piece support member which orients the center line of the bearing at an angle to the center line of the shaft. The use of the two piece support members to properly orient the center line of the rolling bearings facilitates assembly of the device.

8 Claims, 2 Drawing Figures

METHOD FOR MAKING A DEVICE FOR CONVERTING A ROTARY MOTION INTO A LINEAR MOTION

The invention concerns a method for making a device for converting a rotary motion into a linear motion, which devic comprises a housing wherein has been placed a plurality of rolling bearings, the innermost races of which have an inside diameter greater than the outside diameter of a shaft extending through the housing and the innermost races of the rolling bearings placed therein, these bearings having been placed in the housing in such fashion that their center lines are at an angle to the center line of the shaft and their innermost races rest against the shaft. Such a device is disclosed in Dutch patent application No. 7509605.

In the known device the rolling bearings are retained in the housing by at least two prongs, which prongs lie on either side of the shaft extending through the housing and are drawn toward one another by means of bolts, so that the innermost races of the rolling bearings are pressed against the shaft.

The disadvantage of the known device is that it has a complicated design, entailing high manufacturing costs.

The object of the invention is to procure a method for making a device of the type mentioned whereby the device may be manufactured at relatively low cost and relatively quickly.

This object is accomplished in that in the method pursuant to the invention each of the rolling bearings is confined in a member, which member in the center is provided with an aperture, in such fashion that the center line of the bearing is at an angle to the center line of the aperture and the annular inner surface of the innermost race projects inward with respect to the inner surface of the aperture, after which the members are slipped into the bore of the housing in such fashion that the center line of the aperture of each member runs parallel with the center line of the bore, where this bore has been given a cross-sectional shape such that the members may be pushed in a direction transverse to the center line of the bore, the bore is closed off at both sides by a cover having an aperture in such fashion that the members are locked into position adjacent to one another, the shaft is slipped through the bore through the apertures in the covers and the innermost races of the bearings, and by means of pressure element extending through the wall of the housing the members are pushed transverse to the center line until the annular inner surface of each bearing rests against the shaft.

Herein the member in which a rolling bearing is confined may advantageously be made up of two parts, a recess being formed in a side surface of each part such that the parts of the member resting against one another by these side surfaces form a cavity receiving the rolling bearing, so that for confining a rolling bearing this bearing is first placed in a recess in one of the parts and then the other part is placed on the first part and joined thereto.

The members are preferably cylindrical with two flattened side edges situated facing one another, while the bore in the housing has two surfaces situated facing one another, the smallest distance between these surfaces being equal to the distance between the flattened side edges. In this way the members arepreventcd from turning in the housing, while on the other side the members may be pushed in a direction transverse to the center line of the bore, and the flattened side edges of the members slide along the surfaces of the bore.

The members may in simple fashion be made of a synthetic material.

The covers may further be provided with stubs projecting outward, on which the inner ring of a rolling bearing may be mounted for rotary support of the housing.

Each pressure element is preferably formed by a spring whichat one end is in engagement with a cap provided with a screw thread, this cap being screwed through the wall of the housing into an aperture provided with screw thread.

The invention is explained in greater detail by means of the drawing, in which.

Figure 1:
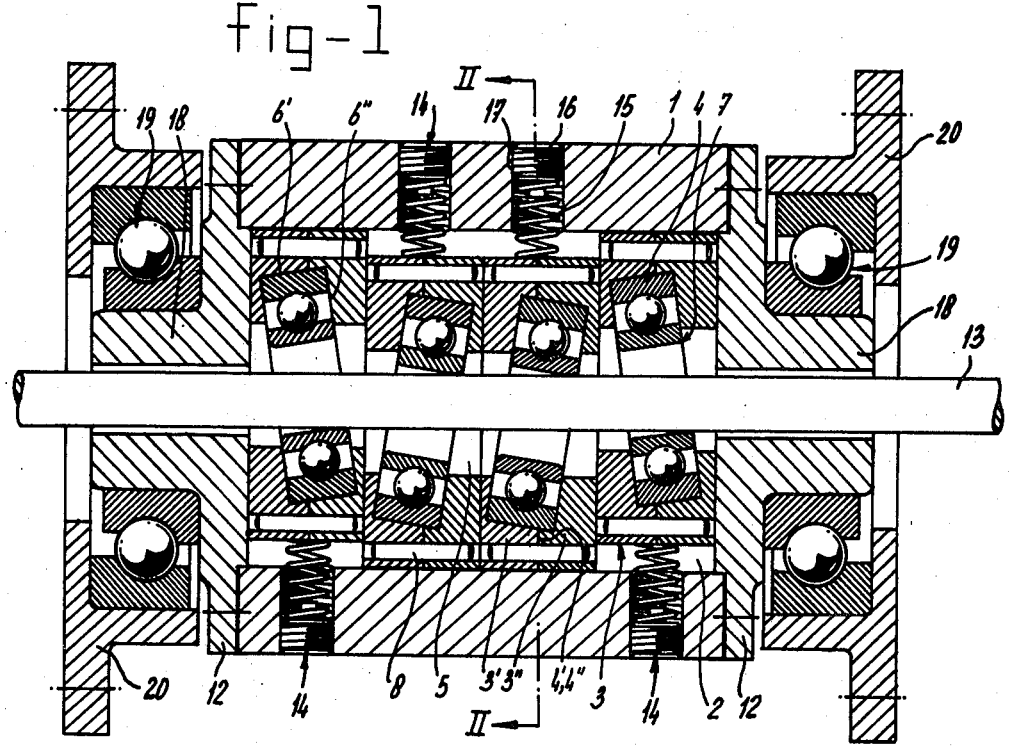
FIG. 1 shows a device pursuant to the invention in longitudinal section.
Figure 2:
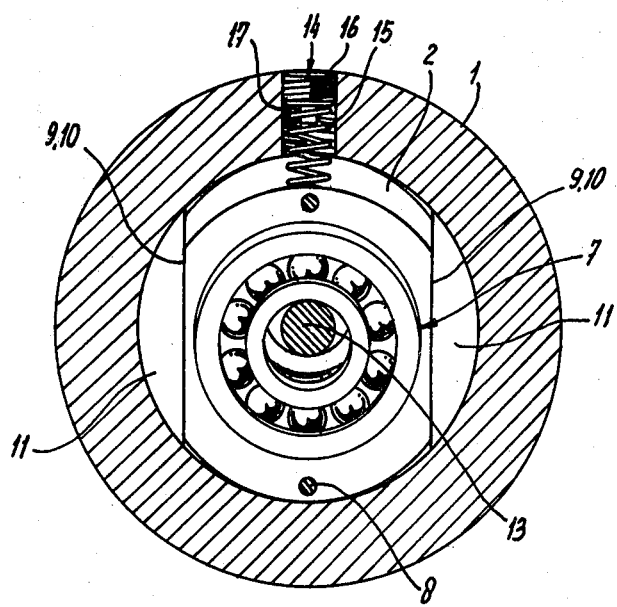
FIG. 2 is a section along line II—II in FIG. 1.

As shown in the drawing, the device comprises a housing 1 having a cylindrical bore 2, in which has been placed a plurality of members 3 with rolling bearings 4 confined therein. Each member 3 is made up of two parts 3' and 3", the side surfaces 4 of which rest against one another. Each part 3', 3" is provided with a central aperture, so that a continuous central aperture 5 is formed. In the parts 3' and 3" recesses 6' or 6" have been made in the side surfaces 4', 4" such that there is formed a cavity wherein rolling bearings 7 may be confined. In assembly of the members 3 first a rolling bearing 7 is placed in a recess 6' or 6" of a part 3' or 3" and then the other part 6" or 6' is placed on the part first mentioned, following which these parts are joined together by means of the pins 8.

When the various members 3 have been assembled in this manner, the members 3 are then slippeed into the bore 2, these members being held in a given radial position owing to the members having been provided with flattened side edges 9 which rest against the surfaces 10 of the segments 11 fitted in the bore 2.

After the members 3 have been alipped into the bore 2 the covers 12 are attached to the housing 1, whereby the members 3 are held fast adjacent to one another in the bore 2. After that the shaft 13 is inserted and then the various members 3 are shifted by means of the pressure elements 14 in directions transverse to the center line of the shaft 13 inside the bore 2 so that the inner races of the rolling bearings 7 come to lie against the shaft 13.

Each pressure element 14 consists of a spring 15 which is in engagement with a cap 16 provided with screw thread, which cap is screwed through the wall of the housing 1 into an aperture 17 provided with screw thread.

Each cover 12 is provided with a stub 18 for receiving the inner race of a bearing 19, so that the housing 1 may be supported rotary by means of the supporting elements 20 provided with a surrounding flange.

The parts 3', 3" may be made of a synthetic material, where connecting means may be formed simultaneously upon formation of these parts, so that no pins or similar connecting means need be applied.

It will be evident that on rotation of the housing 1 in one direction of rotation the shaft 13 is moved axially in one direction, and on rotation of the housing 1 in the other direction of rotation the shaft 13 will be displaced in the other axial direction. Such a device is in particular suitable, for example, for operation of a sliding door, where it is important that it not be possible for parts of the body of a person passing through the closing door to be badly caught. Since the shaft 13 will be displaced in the case of even very slight resistance, because the frictional transfer of rotational moment to the shaft is very small, the danger that a part of the body may be caught hard is obviated.

I claim:

1. A mechanism for converting a rotary motion to a linear motion or vice versa comprising a housing having an axial bore therethrough, an elongated shaft extending through said bore, a plurality of rolling bearings having inner and outer rings and a plurality of rolling elements between the rings circumscribing said shaft and mounted in side-by-side relation in the bore of the housing, support means for the bearings so that the axis of each bearing is located non-parallel to the axis of said shaft, each said support means comprising a pair of complementary annular members having a central aperture running parallel to the center of said housing bore and axis of the shaft, said pair of members formed with a pocket for the rolling bearing to support the bearing with its axis at an angle to said aperture center line and the annular inner surface of the inner ring projects inwardly beyond said aperture surface, which members have been placed resting against one another in the bore of the housing in such fashion that the center lines of the apertures of the members run parallel with the center line of the bore but are displaced transverse to this center line in relation thereto, a cover closing at opposite ends of said bore and pressure elements running through the wall of the housing which elements hold the members in the said position displaced in transversee direction in relation to the center line and means holding the annular members of each pair together to lock the bearing in a fixed angularly disposed position therein.

2. A mechanism for converting a rotary motion to a linear motion or vice versa comprising a housing having an axial bore therethrough, an elongated shaft extending through said bore, a plurality of rolling bearings having inner and outer rings and a plurality of rolling elements between the rings circumscribing said shaft and mounted in side-by-side relation in the bore of the housing, support means for the bearings so that the axis of each bearing is located non-parallel to the axis of said shaft, each said support means comprising a pair of complementary annular members having a central aperture running parallel to the center of said housing bore and axis of the shaft, said pair of members formed with a pocket for the rolling bearing to support the bearing with its axis at an angle to said aperture center line and the annular inner surface of the inner ring projects inwardly beyond said aperture surface, which members have been placed resting against one another in the bore of the housing in such fashion that the center lines of the apertures of the members run parallel with the center line of the bore but are displaced transverse to this center line in relation thereto, a cover closing at opposite ends of said bore and pressure elements running through the wall of the housing which elements hold the members in the said position displaced in transverse direction in relation to the center line and means holding the annular members of each pair together to lock the bearing in a fixed angularly disposed position therein, said members having opposite flat planar side surfaces and said housing bore having opposed flat planar faces closely adjacent and confronting said side surfaces of said members to facilitate assembly of said members in the bore from an axial direction whereby the members are located in a predetermined radial position and non-rotatable in said bore.

3. A mechanism as claimed in claim 1 wherein the members are made of a synthetic material.

4. A mechanism as claimed in claim 1 wherein cover members are mounted at axial ends of said housing and including axially outwardly projecting circumferentially extending stubs for mounting rolling bearings to rotatably support the housing in a support structure.

5. A mechanism as claimed in claim 1 including a plurality of pressure elements in the form of springs mounted in the housing adapted to engage the support means and bias the bearings in pressure applying relation with said shaft.

6. A mechanism as claimed in claim 1 wherein the members of each bearing support means are joined together encapsulating the bearing by means of pins.

7. A method for assembling a mechanism for converting a rotary motion to a linear motion or vice versa, said mechanism comprising an elongated tubular housing having an axial bore therethrough and a plurality of rolling bearings mounted in the bore of the housing, the innermost races of each of the rolling bearings having an inside diameter greater than the outside diameter of a shaft extending through the housing, each of the rolling bearings being mounted in support means comprising a pair of complementary annular members formed with a pocket for the roling bearing adapted to support the bearing with its axis at an angle of the aperture through the members consisting of the steps of placing each of the rolling bearings mounted in the support means in the bore of the housing from one axial end thereof wherein the center line of the aperture of each support member is disposed parallel to the center line of the bore of the housing, closing off the bore of the housing at opposite axial ends by means of a cover member to thereby lock the bearings and support members adjacent to one another, positioning the shaft through the housing bore and through the openings in the covers and urging by means of pressure elements extending through the wall of the housing the support members in a direction transverse to the center line until the annular inner surface of each bearing rests against the shaft and at a position wherein the bearing center line is at an angle to the axis of the shaft.

8. A method as claimed in claim 7 wherein the support members are provided with a pair of opposed flattened side faces and the bore in the housing has confronting planar surfaces and wherein the smallest distance between the surfaces is approximately equal to the distance between the flatened side edge faces of said support members whereby said support members are non-rotatable in the bore of the housing.

* * * * *